United States Patent Office  3,040,063
Patented June 19, 1962

3,040,063
MANUFACTURE OF ANTHRIMIDES AND ANTHRAQUINONYLAMINOBENZANTHRONES
Richard L. Walker, Earlville, Md., assignor to E. I. du Pont de Nemours and Company, Wilmington, Del., a corporation of Delaware
No Drawing. Filed Sept. 21, 1960, Ser. No. 57,377
7 Claims. (Cl. 260—364)

This invention relates to the manufacture of anthrimides and anthraquinonylaminobenzanthrones. These compounds, which are often useful as dyes per se, but are more often used as intermediates for the manufacture of vat dyes, have hitherto been manufactured by heating aminoanthraquinones with chloro- or bromo-anthraquinones or with chloro- or bromo-benzanthrones in a high boiling organic solvent such as nitrobenzene or molten naphthalene, in the presence of an acid acceptor and a copper catalyst, according to the well-known Ullmann process. The anthrimides have also been made by baking the dry reactants together at elevated temperatures, without the use of a solvent (U.S.P. 2,420,022; 1947).

When high boiling organic solvents are used in the condensation process, it is necessary to provide means for avoiding losses of the solvent by evaporation, also for removing the solvent from the reaction product after the reaction is completed. The removal of these solvents involves a costly and hazardous steam distillation or solvent filtration. A considerable amount of these expensive solvents are lost by evaporation or mechanical losses and their handling involves a serious fire and health hazard, since these solvents are flammable and possess toxic properties.

When the dry-bake method is employed for the anthrimide formation, the end product is contaminated with the salt by-products of the reaction. In many instances it is desired to obtain an anthrimide free from salts. In such cases it is necessary to grind the baked products and extract them with hot water.

It is accordingly an object of this invention to provide an economical process for manufacturing anthrimides and anthraquinonylamino-benzanthrones, on a commercial scale, without running into fire or health hazards, without wasting costly materials, and with the production of the products in a state free of by-product salts. Other objects and achievements of this invention will appear as the description proceeds.

Now, according to my invention, the above objects may be achieved by carrying out the mentioned reaction in aqueous medium, at temperatures in the range of 170° to 250° C., in a closed vessel. That this could be done is very surprising in view of the fact that no one has apparently attempted hitherto the condensation of an amino-anthraquinone with relatively heavy-molecular compounds such as halogenated anthraquinone or benzanthrone, in an aqueous medium under pressure. In fact, no one has to my knowledge attempted the above condensation in water at all, and in analogous condensations where lighter amino compounds, such as aniline, have been condensed with chloroanthraquinone, the practice has been almost uniform to work at reflux temperatures and atmospheric pressures.

Apart from the above details as to use of an aqueous medium, in which the reactants are suspended in powdered form, and as to the use of a relatively high temperature (i.e. 170° to 250° C., with a preferred range of 195° to 215° C.) under autogenous pressure, the process of condensation in my invention may follow ordinary, established practice. For instance, it may follow established practice in the use of acid-acceptors, such as magnesium oxide, sodium acetate or sodium carbonate; in the use of copper catalysts, such as copper carbonate, copper powder, cuprous chloride or copper acetate; in the selection of initial materials to produce alpha-alpha, alpha-beta or beta-beta condensation products, as desired, although the last mentioned group (beta-beta) is without commercial interest; and in the selection of materials to produce di-, tri-, tetra- and polyanthrimide type condensations.

Without limiting this invention, the following examples are given to illustrate my preferred mode of operation. Parts mentioned are by weight.

Example 1

A mixture of finely divided materials consisting of 57.7 parts of 1-aminoanthraquinone, 66.4 parts of 1-chloroanthraquinone, 10 parts of basic copper carbonate ($CuCO_3 \cdot Cu(OH)_2$), 5 parts of MgO and 300 parts of water is placed in a steel autoclave and agitated while heating to 205° C. during 14 hours, followed by agitation at this temperature for 16 hours. The reaction mass is cooled and transferred to an acid resistant vessel where it is diluted with 1500 parts of 3.6% hydrochloric acid and agitated at 90° to 95° C. for 2 hours. The acid slurry is filtered while hot, the filter cake is washed acid-free and chloride-free with hot water, and then dried. The product, 1,1'-iminodianthraquinone (1,1'-dianthrimide), is obtained in good yield, and is suitable as an intermediate for the manufacture of acid and vat dyes.

When the 1-chloroanthraquinone in the above example is replaced by 74.1 parts of 1-bromoanthraquinone one obtains the 1,1'-iminodianthraquinone in similar fashion.

Example 2

A mixture of finely divided materials consisting of 24.3 parts of 1-chloroanthraquinone, 22.4 parts of 2-aminoanthraquinone, 5 parts of basic copper carbonate ($CuCO_3 \cdot Cu(OH)_2$), 4 parts of MgO, 504 parts of water and 1 part of a nonionic wetting agent (e.g., the condensation product of 1 mole of a long chain alcohol with 5 moles of ethylene oxide) is placed in a steel autoclave and agitated while heating to 205° C. during 4 hours, followed by agitation at this temperature for 24 hours. The reaction mass is cooled and transferred to an acid resistant vessel where it is diluted with 1500 parts of 4% hydrochloric acid and agitated at 90° to 95° C. for 2 hours. The acid slurry is filtered while hot, the filter cake is washed acid-free and chloride free with hot water, and then dried. A good yield of product which is substantially 1,2'-iminodianthraquinone (1,2'-dianthrimide) is obtained. The product gives a bluish green color in concentrated sulfuric acid which on dilution gives an orange-red precipitate. When dissolved in alkaline $Na_2S_2O_4$ the product gives an orange solution which becomes yellow when acidified.

The same 1,2'-iminodianthraquinone is obtained by condensing equal molar ratios of 2-bromoanthraquinone and 1-aminoanthraquinone in the procedure described in this example.

Example 3

A mixture of aqueous press cakes containing 31.3 parts of 1,4-diaminoanthraquinone, 67.4 parts of 1-chloroanthraquinone, 472 parts of water containing further 5 parts of basic copper carbonate, and 6.2 parts of magnesium oxide is agitated in an autoclave while heating to 195° C. during 4 hours. Heating is continued at this temperature for 36 hours. The reaction mass is cooled and diluted with 1500 parts of 3.6% hydrochloric acid and agitated at 90° to 95° C. for 2 hours. The acid slurry is filtered while hot, the filter cake is washed acid-free and chloride-free with hot water, and then dried. The product, 1,4-bis(1-anthraquinonylamino)anthraquinone, is obtained in good yield and is suitable for conversion to the corresponding vat color (C.I. Vat Brown 1) by well known ring-closure procedures.

*Example 4*

A mixture of finely divided materials consisting of 27.2 parts of 1,5-dichloroanthraquinone, 44.8 parts of 1-aminoanthraquinone, 3 parts of basic copper carbonate, 20 parts of magnesium oxide and 115 parts of water is placed in an autoclave and agitated while heating to 205° C., and the temperature is maintained for 24 hours. The reaction mass is cooled and transferred to a glass vessel where it is diluted with 1500 parts of water, acidified with hydrochloric acid and agitated at 90° to 95° C. for several hours. The acid slurry is filtered while hot, the filter cake is washed acid-free and chloride-free with hot water, and then dried. The product, 1,5-bis(1-anthraquinonylamino)anthraquinone, is obtained in good yield and is suitable for conversion to a vat color (C.I. Vat Orange 11) by the usual carbazolation technique.

*Example 5*

A mixture of finely divided materials consisting of 34.3 parts of 1,4,5,8-tetrachloroanthraquinone, 83.4 parts of 1-aminoanthraquinone, 7.9 parts of basic copper carbonate, 9.2 parts of magnesium oxide and 390 parts of water is placed in an autoclave and agitated while heating to 205° C. during 4 hours. Heating at 200° to 210° C. is continued for 16 hours. The reaction mass is cooled and diluted with 2000 parts of water, acidified with hydrochloric acid and agitated at 90° to 95° C. for 3 hours. The acid slurry is filtered while hot, the filter cake is washed acid-free and chloride-free with hot water, and then dried. The product, 1,4,5,8-tetra-(1-anthraquinonylamino)anthraquinone, is obtained in good yield and is suitable for conversion to the corresponding color: C.I. Vat Green 8.

*Example 6*

A mixture of finely divided materials consisting of 44.5 parts of 1-amino-4-benzoylaminoanthraquinone, 55.7 parts of 1-benzoylamino-5-chloroanthraquinone, 11.2 parts of magnesium oxide, 32.7 parts of sodium acetate, 0.9 part of copper powder and 495 parts of water is placed in a steel autoclave and agitated while heating to 205° C. during 4 hours, followed by agitation at this temperature for 16 hours. The reaction mass is cooled and diluted with 1500 parts of 5% hydrochloric acid and agitated at 90° to 95° C. for 2 hours. The acid slurry is filtered while hot and the filter cake is washed acid-free and chloride-free with hot water and then dried. The product, 4,5'-dibenzamido-1,1'-iminodianthraquinone is obtained in good yield and may be converted to the corresponding carbazole color, by acid ring closure.

*Example 7*

A mixture of finely divided materials consisting of 77.3 parts of 1-amino-5-chloroanthraquinone, 5 parts of basic copper carbonate, 8 parts magnesium oxide and 442 parts of water is placed in a steel autoclave and agitated while heating to 205° C. during 12 hours. The temperature is maintained for 16 hours and the reaction mass is then cooled and diluted with 1500 parts of 4% hydrochloric acid and agitated at 90° to 95° C. for 2 hours. The acid slurry is filtered while hot and the filter cake is washed acid-free and chloride-free with hot water and then dried. The polyanthrimide, formed by self-condensation, contains less than 1% chlorine.

*Example 8*

A mixture consisting of 34.0 parts of powdered 4-aminoanthraquinone-2′,1′(N)benzacridone, 24.3 parts of 1-chloroanthraquinone, 5.0 parts of basic copper carbonate, 4 parts of magnesium oxide and 384 parts of water is placed in an autoclave and agitated while heating to 205° C. over a period of 14 hours. Heating at 200° to 210° C. is continued for 16 hours. The reaction mass is diluted with 2000 parts of cold water and strongly acidified with hydrochloric acid. After agitating at 90° to 95° C. for one to two hours, the acid slurry is filtered hot and the filter cake is washed chloride-free and acid-free with hot water and then dried. The product anthrimide, containing less than one percent chlorine, is obtained in good yield. It has the formula

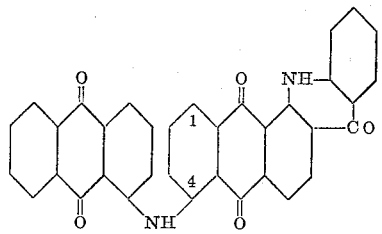

*Example 9*

A mixture of finely divided materials consisting of 23.8 parts of 1,4-diaminoanthraquinone, 55.4 parts of 1,5-dichloroanthraquinone, 44.6 parts of 1-aminoanthraquinone, 5 parts of basic copper carbonate, 8 parts of magnesium oxide and 340 parts of water is placed in an autoclave and agitated while heating to 205° C. during 11 hours, followed by agitation at this tempertaure for 16 hours. The reaction mass is cooled and diluted with 1500 parts of 3.6% hydrochloric acid and agitated at 90° to 95° C. for 2 hours. The acid slurry is filtered hot, the filter cake is washed acid-free and chloride-free with hot water and then dried. The anthrimide containing 2.0 percent chlorine is obtained in good yield.

*Example 10*

A mixture of finely divided materials consisting of 38.8 parts of 1-aminoanthraquinone, 56.5 parts of 3-bromobenzanthrone, 3.0 parts of cuprous chloride, 1 part of copper powder, 11 parts of sodium carbonate and 519 parts of water is placed in an autoclave and agitated while heating to 205° C. over 4 hours, followed by agitation at this temperature for 12 hours. The reaction mass is cooled and diluted with 1500 parts of 4% hydrochloric acid and agitated at 90° to 95° C. for 2 hours. The acid slurry is then filtered hot, the filter cake is washed acid-free and chloride-free with hot water, and then dried. The product, 1-(7-oxo-7H-benz(de)anthracen-3-ylamino)-anthraquinone, sometimes named 3-(1-anthraquinonlyamino)-benzanthrone, is obtained in good yield, and is suitable as an intermediate for the manufacture of the corresponding color: C.I. Vat Green 3.

*Example 11*

A mixture of finely divided materials consisting of 61.8 parts of 3-bromobenzanthrone, 47.6 parts of 1,5-diaminoanthraquinone, 10 parts of basic copper carbonate, 16 parts of MgO and 270 parts of water is placed in an autoclave and agitated while heating to 205° C. during 12 hours, followed by agitation at this temperature for 16 hours. The reaction mass is cooled and diluted with 1500 parts of 3.6% hydrochloric acid and agitated at 90° to 95° C. for 2 hours. The acid slurry is filtered hot and the filter cake is washed acid-free and chloride-free with hot water, and then dried. The product anthrimide 3-(5-amino-1 - anthraquinonylamino)benzanthrone, containing 1.5% bromine is obtained in good yield.

*Example 12*

A mixture of finely divided materials consisting of 37.5 parts of 3,9-dibromobenzanthrone, 43.3 parts of 1-aminoanthraquinone, 12.5 parts of sodium carbonate, 3.8 parts of copper acetate and 500 parts of water is placed in an autoclave and heated, with agitation to 215° C., followed by heating at 210° to 215° C. for 24 hours. The reaction mass is cooled and diluted with 1500 parts of 3.6% hydrochloric acid and agitated at 90° to 95° C. for 2 hours. The acid slurry is filtered hot and the filter cake is washed chloride-free and acid-free with hot water, and then dried. The product, 1,1'-(7-oxo-7H-benz(de)-anthracen-3,9-ylenediimino)dianthraquinone, sometimes called 3,9-di(1-anthraquinonylamino)benzanthrone, is obtained in good yield, and is suitable as an intermediate for the manufacture of the corresponding vat dye: C.I. Vat Black 25.

*Example 13*

A mixture of finely divided materials consisting of 50.0 parts of 3,9-dichlorobenzanthrone, 74.6 parts of 1-aminoanthraquinone, 18.5 parts of sodium carbonate, 4.3 parts of copper acetate and 543 parts of water is placed in an autoclave and agitated while heating to 215° C. during 4 hours, followed by agitation at this temperature for 24 hours. The reaction mass is cooled and diluted with 1500 parts of 3.6% hydrochloric acid, and agitated at 90° to 95° C. for 2 hours. The acid slurry is filtered while hot, the filter cake is washed acid-free and chloride-free with hot water, and then dried. The product, 1,1'-(7-oxo-7H-benz(de)anthracen - 3,9 - ylenediimino)dianthraquinone, is obtained in good yield and is suitable as an intermediate in the manufacture of the color: C.I. Vat Black 25.

*Example 14*

A mixture of finely divided materials consisting of 30.9 parts of 3-bromobenzanthrone, 37.4 parts of 1-aminoanthraquinone-2',1'(N)-benzacridone, 5 parts copper acetate, 2.2 parts MgO and 436 parts of water is placed in an autoclave and agitated while heating to 205° C. in 4 hours, followed by agitation at this temperature for 24 hours. The reaction mass is cooled and diluted with 1500 parts of 3.6% hydrochloric acid and agitated at 90° to 95° C. for 2 hours. The acid slurry is filtered while hot, the filter cake is washed acid-free and chloride-free with hot water, and then dried. The product anthrimide containing 2.8% chloride is obtained in good yield. It has the formula

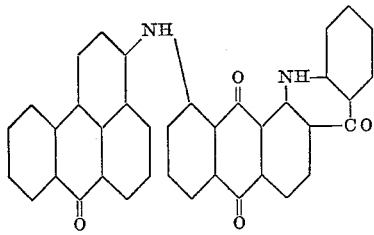

It will be understood that the details of the above examples may be varied within the skill of those engaged in this art.

It will also be noted that in addition to the economic and safety advantages mentioned in the introductory part of this specification, my invention offers the very special and valuable advantage that it enables one to use the initial materials (amino-antraquinone and halogeno-anthraquinone or -benzanthrone) in the form of press cakes, as they are obtained in their respective syntheses, without the need of drying and milling the press cakes, as would be the case with the processes hitherto practiced in this art.

I claim as my invention:

1. In the manufacture of a member of the group consisting of anthrimides and anthraquinonylaminobenzanthrones by heating a water-insoluble primary aminoanthraquinone with a water insoluble halogen-containing compound selected from the group consisting of chloroanthraquinones, bromoanthraquinones, chlorobenzanthrones and bromobenzanthrones in the presence of an acid absorber and a copper catalyst, the improvement which comprises heating the reactants suspended in water at a temperature in the range of 170° to 250° C., under autogenous pressure, until the condensation is substantially complete.

2. An improvement as in claim 1, wherein the temperature of the reaction is between 195° and 215° C.

3. A process of producing an alpha-alpha-dianthrimide, which comprises heating together an aqueous suspension of 1-amino-anthraquinone and a 1-halogeno-anthraquinone, in a sealed vessel and at a temperature of 195° to 215° C., said suspension containing further an acid absorbing agent and a copper catalyst.

4. A process of producing a (1-anthraquinonyl-amino)-benzanthrone, which comprises heating together an aqueous suspension of 1-amino-anthraquinone and a Bz-halogeno-benzanthrone, in a sealed vessel and at a temperature of 195° to 215° C., said suspension containing further an acid absorbing agent and a copper catalyst.

5. A process as in claim 3 when applied to the manufacture of 4,5'-dibenzamido-1,1'-iminodianthraquinone by condensing 1 mole of 1-amino-4-benzoylamino-anthraquinone with 1 mole of 1-benzoylamino-5-chloro-anthraquinone in the presence of sodium acetate and a copper catalyst.

6. A process as in claim 4 when applied to the manufacture of 3,9-di(1-anthraquinonylamino)benzanthrone by condensing 1 mole of 3,9-dibromobenzanthrone with 2 moles of 1-aminoanthraquinone in the presence of sodium carbonate and copper acetate.

7. A process of producing 1,4,5,8-tetra(1-anthraquinonylamino)anthraquinone, which comprises heating together an aqueous suspension of 1,4,5,8-tetrachloroanthraquinone and 1-aminoanthraquinone, in the mole ratio of 1:4 respectively, in a sealed vessel and at a temperature of 200° to 210° C., said suspension containing further magnesium oxide and a copper catalyst.

References Cited in the file of this patent

UNITED STATES PATENTS

| 1,011,068 | Luttringhaus | Dec. 5, 1911 |
| 1,909,690 | Kunz et al. | May 16, 1933 |

OTHER REFERENCES

MacArdle: "Use of Solvents," pages 1–3 and 21 (1935).